United States Patent
Walden

(10) Patent No.: US 10,369,835 B1
(45) Date of Patent: Aug. 6, 2019

(54) GRIPPING AID AND SYSTEM

(71) Applicant: Deitra G. Walden, Temple Terrace, FL (US)

(72) Inventor: Deitra G. Walden, Temple Terrace, FL (US)

(*) Notice: Subject to any disclaimer, the term of this patent is extended or adjusted under 35 U.S.C. 154(b) by 0 days.

(21) Appl. No.: 16/280,436

(22) Filed: Feb. 20, 2019

Related U.S. Application Data

(60) Provisional application No. 62/651,764, filed on Apr. 3, 2018.

(51) Int. Cl.
| | |
|---|---|
| *B43K 23/00* | (2006.01) |
| *B43K 23/004* | (2006.01) |
| *G09B 11/02* | (2006.01) |
| *B43K 23/008* | (2006.01) |
| *B43K 23/012* | (2006.01) |
| *B43K 23/016* | (2006.01) |

(52) U.S. Cl.
CPC .......... *B43K 23/004* (2013.01); *B43K 23/008* (2013.01); *G09B 11/02* (2013.01); *B43K 23/012* (2013.01); *B43K 23/016* (2013.01)

(58) Field of Classification Search
CPC .... B43K 23/00; B43K 23/001; B43K 23/004; B43K 23/008; B43K 23/012; B43K 23/016
USPC ............... 401/6, 7, 8, 48; 15/443; 434/166
See application file for complete search history.

(56) References Cited

U.S. PATENT DOCUMENTS

| | | | | |
|---|---|---|---|---|
| 5,662,423 A | * | 9/1997 | Walden | B43K 23/012 15/437 |
| 6,854,681 B2 | * | 2/2005 | Kish | A45F 5/004 242/380 |

* cited by examiner

*Primary Examiner* — David J Walczak
*Assistant Examiner* — Joshua R Wiljanen

(57) ABSTRACT

An upper component has a generally cone shaped configuration A lower component has a generally cylindrical shaped configuration. Both have an upper end and a lower end. The lower end of the upper component and the upper end of the lower component are integrally fabricated to form a lower point and a high point. A V-shaped cut out is formed in the upper end of the upper component above the lower point. A strap has an arcuate configuration with a top and a bottom. The top is integrally fabricated with the upper end of the upper component. The bottom is integrally fabricated with the intersection. The system has a primary mode of operation with the exterior surface exposed and the strap exposed and on the exterior surface. The system has a secondary mode of operation with the interior surface exposed and the strap hidden within the upper component.

7 Claims, 7 Drawing Sheets

GRIPPING AID AND SYSTEM

RELATED APPLICATION

The present application is based upon Provisional Application No. 62/651,764 filed Apr. 3, 2018. The present application is an improvement over my prior Application 670,407 filed Jun. 25, 1996 now U.S. Pat. No. 5,662,423.

BACKGROUND OF THE INVENTION

Field of the Invention

The present invention is a handwriting gripping aid that is simple to use and has various methods of use to assist adults and children in gaining the ability to improve finger-pencil pressure upon a writing implement, hand steadiness, and a firmer and improved pencil grip and to aid in eliminating poor penmanship grips.

DESCRIPTION OF THE RELATED ART

Over several years while working with children and adults to improve handwriting skills, the current applicant encountered many adults with medical conditions consisting of but not limited to; arthritis, strokes, individuals recovering from hand surgery, and children and adults with either autism, dysgraphia and or dyspraxia difficulties. The above conditions were reported by many to make legible handwriting difficult. Several senior citizens complained and were seen to have difficulty applying pressure to a pen or pencil. Several reported to have slight pain and stiffness while trying to hold on to a writing implement as well as, difficulty in wrapping fingers around the size of a writing implement. Also encountered were individual who did not have the strength to apply proper pressure while pressing down on a writing implement.

In speaking with physical therapist, numerous individuals suffering from weak fine motor pencil skills, the present applicant saw a need to provide a gripping aid that helps to increase pencil pressure, and provide for a stronger and improved pencil grip and hand steadiness. a hand finger gripper that encourages and assists with hand-finger movement, and a gripper that provides stability to remain on top of a writing implement, and a gripper that aids in positioning and in retaining proper placement of a users' thumb onto a writing implement.

It was also brought to the attention of the inventor that many parents complained in the way children hold their pencils that do not give the best support for controlling and using a pencil. It was observed that this problem was not just related to children but also adults. Children as well as many adults hold a pen or pencil by positioning a thumb to cross over to engage the index finger in a squeeze-like fashion to hold a writing device. From years of experience in teaching children and seeing adults with this type of grip, the applicant has found that this kind of grip to hold a writing implement is awkward, slows the process of writing and later causes fatigue, and finger-hand cramps when writing for long periods of time.

The current applicant and inventor of Walden's U.S. Pat. No. 5,662,423, Sep. 2, 1997, adds new unobvious features, methods of use, instructions and indicia that was not disclosed In Walden's original patented gripping aid for use mainly by children learning to use a pencil or crayon. Although the gripping device provided for proper finger placement and support for many users, over the years, problems were identified, and there was a need to further accommodate users with limited hand finger mobility.

There were several drawbacks in its acceptance of use. For example, often, users found the patented gripper to be difficult to use. Many were confused as to knowing whether to place their index finger through the inside of the gripping aid or through the attached strap. Users' also found the circular upper shape of the gripper did not allow for better ventilation and cooler use. Many parents felt that the gripping aid did not prevent a user from improperly positioning the placement of their children's thumb onto a writing implement, and many adults individuals with weak hand finger mobility and agility wanted a gripper that provided support and a wider form to grasp.

The present gripping aid better supports and includes the handwriting needs of adults and anyone with limited hand-finger and thumb mobility, weak finger-pencil pressure, hand finger steadiness onto a writing implement, improper thumb placements on a writing implement, awkward pencil and pen grips, as well as, for young children and adults in need of correcting a weak and improper pencil grasp.

The current design and methods of use in its preferred embodiment entails a multi-purpose, reversible conic shaped barrel with an upper open end that is semi-circular at the top, and has an opening in the shape of a (V) and a lower angled elongated end for receiving a writing implement. A strap is attached to the upper and lower part outside of the conic-shaped gripper has special dimensions within the inside of the cone to allow the lower half of the index finger to interact with the inside wall of the lower part of the gripping aid to assist in applying pressure onto a writing implement.

Unlike Walden's previous gripping aid, the importance of the cut out (V) shape in the upper part of the conic gripping aid helps to indicate the area in which the index finger should be positioned within the cone and onto the top of a writing implement. Knowing where to insert the index finger greatly reduces the confusion of placing the index finger though the attached strap.

Identifying where to place the middle finger now is easily and naturally positioned as the attached strap is located opposite of the cut out (V) shape. To retain a middle finger through the strap, the open (V) shape should always face the user. The border of the cut out V part on the front part of the conic shaped barrel may be outlined in black or other darker colors to highlight the part of the gripper that should face the user and may also contain indicia on the front part of the gripper below the (V) shape, 2 circular dots and a smile or some other design that faces the user.

A new and unobvious feature of the present invention is that the valley of the (V) also becomes an indicator as to where to place the attached strap to retain and support a proper placement of a thumb. To determine if a thumb will be retained, the valley of the cut out (V) should face a users middle finger of a user's dominate hand and will provide thumb support for either a right or left handed individual. Placing the lower part of the thumb through the now repositioned strap prevents the thumb from crossing over a writing implement and touching a user's index finger in a squeeze like position in an effort to hold a writing implement.

The present gripping aid helps to eliminate this problem by implementing a method of use that was unobvious and instructions that allows the strap to be positioned in a way in which the thumb is positioned and retained to prevent the crossing over of the thumb to the middle to upper part of the index finger to hold a pen or pencil but also has instructions and methods for a middle finger to be supported by the same strap.

Although instructions as to placement on the outer side of the gripping aid are given in general in Walden's original patented gripping device, it does not indicate use of a strap for retaining a thumb for preventing the crossing over of a thumb to the upper to middle of the index finger as a grasp to hold a writing implement.

Positioning the strap to accept and retain a thumb helps a user to improve the ability to hold and produce a proper thumb pressing action in conjunction with the index finger and thumb onto a writing implement. A person with limited hand finger-thumb mobility does not have the same degree of strength and agility to position their thumb on a narrow pencil. The wider, softer material reflected in the conic gripping aid actually provides a wider gripping surface for placement and squeezing action of the thumb onto a pencil or pen.

The present flexible gripping aid solves this problem by implementing a method of use that was unobvious in which the attached strap can be used to not only retain and position a middle finger but also by positioning the strap in a different way allows a thumb to be retained in a left or right handed individual allowing for a more effective grip that prevents the crossing over of the thumb to the middle to upper part of the index finger. Also the cut out valley of the (V) allows for better ventilation and reduces the buildup of heat during use.

The present gripping aid consist of a flexible soft material that allows for the gripping aid to be turned inside out for users with limited hand finger agility. It was observed that users during Waldens' previous patent found it difficult to place their middle finger through the attached strap and insert their middle finger inside of the conic shaped gripper . . . . A solution to the problem of users' with hand finger stiffnes and agility difficulties in placing their middle finger through the attached strap, a soft and flexible material allows for the present gripping device to be turned inside out to eliminate the outer bottom strap.

It was discovered that by turning the gripping aid inside out, eliminating the appearance of the outer strap, that adults and children with limited fine-motor agility could still receive an improved ability to control a pen or pencil by placing their index finger and thumb around the outside and middle finger underneath the conic shaped gripping aid.

Given the importance of helping those with limited hand finger ability or arthritis related conditions that affect the ability to grasp and apply pressure and to give support in placing and squeezing the sides of a pen or pencil, the present gripping aid was adapted to have a reversible factor to eliminate the outer appearance of a strap. With the reversible side of the gripper present, individuals could be able to obtain a wider and easier grasp by placing their index finger and thumb around the outside and middle finger underneath the conic shaped gripping aid to better support a writing implement and improve pencil-pen control.

When the gripping aid is turned inside out, the position of the strap resides inside the gripping aid. Having the strap inside removes the necessity of a person with stiff hand mobility from trying to insert their middle finger through an attached strap.

Although the strap is now no longer present on the outside of the gripping aid, the gripping aid will also allow for insertion of the index finger into the gripping aid and onto the writing implement to provide the user with appropriate strength in controlling a writing implement and an increased ability to press down on a writing implement, improved balance in controlling a writing implement and hand steadiness.

Regarding handwriting devices that assist those with weak hand finger and thumb motor control, dexterity disabilities, arthritis or related finger restrictions, numerous attempts have been made over the years to provide comfort, support and ease of use.

However, these devices have inherent drawbacks and simply do not give the kinds of different inner support, and created finger pressure upon a writing implement that Walden's present gripping aid, methods of use and altered embodiments that the present gripping aid offers.

In general, patented devices that relate to hand finger disabilities contain devices that require some sort of attachments or binding to the wrist and or fingers. Several inventions may include straps that tightly bind the index fingers, thumb or middle finger to a writing implement, such inventions are cumbersome, uncomfortable, very restrictive and offer little movement of the fingers, they do not provide for helping to increase pencil pressure, or hand finger steadiness and support while using a writing implement.

The following devices simply do not give the kind of support that is needed for individuals with slight to moderate hand-finger weakness or limitations.

1. For instance, U.S. Pat. No. 147,930, 1874, Galland, refers to a series of rings formed with collars for adjusting them on the pen-holder, so as to allow the insertion of the fingers in any desired positions, thus relieving the fingers of the muscular strain which would otherwise be necessary. The rings are made of sheet metal and sized to fit one of the fingers. The device is designed to overcome handwriting difficulties experienced by adults and Children. This device totally restrains the upper and lower part of the index finger, the thumb and middle finger.

2. U.S. Pat. No. 5,980,257, 1999, Heinz, relates in general to a method and device teaching proper holding and grasping of a pen or pencil. The device comprises a wristband of a flexible loop which is capable of placement around the wrist. The pencil loop is also comprised of a flexible loop that accepts a writing instrument. This invention refers to a method and device for assisting handwriting training which fosters a proper tripod writing grip, places the ring and little finger into a proper handwriting position and also helps to build the handwriting muscles. The device for assisting handwriting training is especially useful for persons having decreased hand strength or an inappropriate grasp pattern and for assisting children to learn a proper grasp pattern. This device is complicated to use and still requires coordination for the index finger to stay on top of a pencil. It does not retain any of the finger digits or aid in increased hand-finger pressure.

3. U.S. Pat. No. 5,468,083, 1995, Chesar, refers to a writing instrument hand grip to facilitate gripping ease and comfort and to improve handwriting for people with a hand and finger dexterity disability. A pyramidal tetrahedron has a writing material detachable mounted to one of more of its apexes. Its faces may be concavely contoured and provided with friction enhancing surfaces. Its pyramidal tetrahedon shape is awkward and restricts movement of individuals who are able to grasp a writing device. The invention does not aid individuals who wish to have a more natural ability to grasp, apply pressure and control a writing device.

4. U.S. Pat. No. 4,602,885, 1986, Bischoff et al., which refers generally to cuffs for use by the physically handicapped, and is more specifically concerned with a widely adjustable cuff receivable on a person's hand for holding an elongated implement in a rather natural position. The present invention provides a single shapeable member to be individually formed by the user. The device is easily formed to fit around a person's hand, and can be bent to conform to either the right hand or left hand depending on the preferred hand of the user. In its simple form, the device of the present invention comprises a base plate having a finger supporting extension, and side members for extending around a person's hand. The implement is held in a very natural manner without requiring the user to have any gripping ability. In another embodiment of the invention, the base plate may have a wrist extension for further supporting the device about the user's wrist. However, this device is designed for individuals without the ability to grasp or hold a pencil in the preferred tri-pod position and prevents the user from positioning the end part of the thumb to touch the pencil in support of holding a pencil.

5. U.S. Pat. No. 1,206,976, 1916, Barth, refers to a device adapted to be slipped on the index finger of the hand for the purpose of retaining and supporting a pencil or similar marking instrument in such position that it may be readily grasped by the index finger and thumb of the hand when desired, and when released will assume a position to be out of the way such that the hand of the user will be free to be used as desired. The device comprises a strip of pliable resilient material which is provided with a loop adapted to hold the pencil or other writing implement and a loop which is adapted to engage the index finger of the hand of the user. Although all digits touch the writing implement, the device makes it possible for the user to have a pencil readily available and when released stays in place on the finger thus eliminating the need to pick up a pencil every time they wish to use it. The gripping device offers no handwriting help in controlling a pencil but only guides the index finger to position itself onto a writing device.

6. U.S. Pat. No. 426,324, 1890, Ramsey, refers to a device for holding and supporting a penholder, pencil, or similar article. The device is adapted to be used by persons whose hands or fingers are crippled, paralyzed, or weak, or otherwise assisting persons in writing. Fingers are not engaged at all to hold a writing implement. There is a pen attached to a mechanism in which the hand moves the pencil. The "pen device for cripples" is used by persons whose hands and fingers are crippled, paralyzed or weak. It comprises a hand loop that fits across the upper palm of the hand and has an upper attachment that totally retains a writing implement. A grip around the writing device is not needed but the fingers and hand guide the writing device.

7. U.S. Pat. No. 4,957,442, 1990, Prater, refers to an apparatus and method for assisting the disabled to handwrite. The apparatus comprises a stabilizing weight member attached to the hand by a glove or other means. The weight member has angled finger grip protrusions for forming slots for the fingers of the hand to rest in and to hold and control the movement of the weight member. The weight member has a roller ball socket in its underside in which is rotatably mounted a roller ball. The weight member also has a writing instrument holder which holds the writing instrument so that it will write on a writing surface when the roller ball is against that surface. The hand moves the weight member by rolling the roller ball against the writing surface so that the writing instrument writes. The apparatus is attached to the hand. A writing instrument is inserted into the writing instrument holder. The hand attached to the weight member is moved so that the gliding means is against the writing surface. Then the hand attached to the weight member is moved so that the gliding means glides against the writing surface and the writing instrument writes on the surface. Thus, a disabled person may more easily handwrite. This device is designed for an individual with very little ability to grasp as the weighted ball that rolls helps the user to grasp and manipulate a pen. It is complicated to use and the glove would seem to become hot during prolonged use.

8. U.S. Pat. No. 6,315,476 82, 2001, Nakagawa, refers to a writing implement for use by those handicapped in their hands and/or finger(s) comprising a grip having a terminal end having a curved surface adapted to contact with the palm of a user, the grip being formed such that the grip is held with the fingers and the palm in such a way that the grip is wrapped by the hand; and pen point extending from a front end of the grip with a given angle. The grip can optionally have one or more concave contours adapted to fit the finger(s) of the user, wherein each concave contour can fit one or more fingers. The device is heavy and awkward to use and does not position and retain any of the digits.

9. U.S. Pat. No. 2,273,044, 1942, Johnson, concerns a device invented to alleviate finger pressure and fatigue in writing by providing an elastic splint for the first joint of the forefinger and by providing means on the splint to support the implement so that it is always parallel to and in contact with the splint. The device comprises a tapered elastic sleeve portion of rubber or the like to provide a yieldable cushioning brace for the first joint of the digit and a second portion of rubber or the like carried by said first portion at the side thereof and aperture to receive and to hold said implement in relation to the sleeve portion. This device is formed to snuggly encase and hold the index finger to alleviate finger pressure. It provides no means to support the middle finger or thumb or aid in applying proper pressure while using a writing device.

10. U.S. Pat. No. 6,343,885 81, 2002, Heyne, refers to a hand-held implement which comprises a hand grip body having a rounded, bulbous upper end portion and lower end portion which is inwardly tapered along at least part of its length, the upper end portion having an end area facing in the opposite direction to the end face for application of pressure by the user's palm at the base of the user's index finger, and a tool mounted in the body and having a working end projecting from the end face of the lower end portion of the body. The implement is a writing instrument and the tool is a pen or pencil. The overall length of the implement is such that the pen or pencil point projects from the ends of the fingers for engagement with a paper surface on which the user wishes to write. Writing can then be done by application of pressure by the palm of the hand, without having to grip and apply significant pressure with the fingers.

11. U.S. Pat. No. 2,184,130, 1939, Tizio, teaches a metal guide holder for writing instruments. Specifically, the device comprises a sheet metal body having an annular coil for engaging about one's finger which connects at right angles with a section having a tubular socket for engaging a pencil or other writing implement. While it is intended that the middle finger (hereinafter third finger) of the user's hand engages through the annular coil, there is no mechanism to properly orient the user's thumb or index (hereinafter second) finger. Additionally, the device is manufactured of metal, uncomfortable and complicated to use.

12. For instance, U.S. Pat. No. 1,783,657, 1930, Kuntzleman, refers to a device for retaining fingers in the proper position. It comprises an elongated substantially tubular body or finger rest in which the top wall is relatively flat for retaining fingers in position upon the rest using a strap member that may be formed of metal, or leather or other suitable material. Although the thumb and fingers are relaxed and directly engage the writing implement, the third finger is not positioned or retained. The device allows for the fingers to be relaxed and allows for arm movement during handwriting.

13. U.S. Pat. No. 7,371,026 B2, 2008, Berger, refers to a device for teaching proper penmanship by assisting the user in holding the writing implement in the correct orientation. A first component is attached to the user's middle finger while a second component encircles the implement. A section of the second component is releasably attached to the first component, holding the fingers in proper position for writing. This device has nothing to prevent the thumb from crossing over to the index finger in learning to use a writing instrument. It is awkward and restrictive.

For the foregoing reasons, there is a need for a simple, multi-purpose, flexible gripping aid that is reversible and provides a variety of support. A gripper that promotes a tri-pod grip, retains a proper grip, and provides for increased finger pressure upon a writing implement. A gripper that aids individuals with hand-finger related difficulties, and encourages a proper grasp and legible handwriting. a device that is comfortable to use and helps to eliminate handwriting cramps, and pain during prolonged use. A gripper that is soft, and provides for more than indentations to position fingers and thumb and a device that aids an individual with hand-finger stiffness and weak and limited hand-finger mobility.

Walden's current gripping aid and methods of use provide for the concerns mentioned above and meets the needs of supporting several handwriting problems. Currently there is not a gripping aid that is so versatile, has flexible material and can be turned inside out to address the needs of children and adults in need of a wider handwriting support, and a gripping aid that aids in positioning, strengthening, and retaining an index finger, thumb or middle finger for different levels of hand-finger support.

SUMMARY OF THE INVENTION

It is the object of the present invention to provide a one-piece multi-purpose handwriting gripping aid, and a variety of methods of use that better address problems encountered by children and adults with weak or limited hand finger-mobility.

It is a further object to provide a handwriting gripping aid that is simple in design, easy to use, flexible and can be used by either right or left handed adults and children for the purpose of improving hand writing legibility and better pencil pressure and control on a writing implement.

It is a further object of the present invention to provide a gripping aid that may be used as a physical therapy tool for short to long term use to allow a user to gain the ability to apply increased finger-pencil pressure, hand steadiness, and improved control on a writing implement.

It is a further object of the present invention to provide users with arthritis like conditions, phonological difficulties, hand-finger surgery patients, improper grips, and those with limited and or weak pencil grips a gripping device that provides a firmer grasp and increased pencil or pen pressure while writing to improves legibility and readablity of hand written work.

It is a further object to provide a one-piece multi-purpose, handwriting device that presents several ways of use and methods that better address problems encountered by adults or anyone with physical limitations.

It is a further object of the present invention to provide a gripping aid to support hand-finger digits for individuals learning a proper grip, or in need of correcting a pen-pencil grip.

It is a further object of the present gripping aid to produce, a durable, reversible, economical and flexible gripping aid made of a simple construction.

It is a further object of this invention to include a method and a centered cut out indentation in the shape of a letter (V) or U shape in the upper wider circular part of the gripping aid.

It is a further object of the writing aid in conjunction with cut out v shape located in the upper part of the gripper to provide for different ways in which the gripping aid may retain and improve movements of the index finger, middle finger and thumb upon a writing implement.

It is a further object to provide indicia outlining the bottom of the v or u shape with darker colored lines, It is a further object to provide indicia positioned on the upper outer part of the gripping aid, and located below the center part of the cut out (V) shape in the form of smiley faces, animal designs but-not limited to other symbols, to help users in knowing how to use and hold the gripping device.

It is a further object to recognize and assign dimensions within the conic gripping device to claim as unobvious the increased force created in applying pressure upon a writing implement as a result of the interaction within the inside of the conic shaped gripper in relation to the inner wall and interaction of the lower part of the index finger upon the lower inside wall of the conic shaped gripping aid.

When a user presses down on a writing implement and comes in contact with the inside wall surface of the conic gripper, it produces a spring-like inner force that aids in increasing a downward pressure onto a writing implement that results in the user being able to produce a darker print.

It is a further object to provide a writing aid with a longer elongated and angled lower end to support a writing device and downward pressure exhibited by adults or anyone with hand-finger weakness or limitations.

It is a further object to provide a gripping aid that helps retain and train a user's index finger to stay on top of a writing implement when applying a downward pressure onto a writing implement.

It is a further object of this invention to provide a method of use and an attached strap connecting to the lower and upper part of the gripper for the purpose of retaining and providing support and hand steadiness to a thumb or middle finger while using a writing implement.

It is a further object to provide a reversible gripping aid that eliminates the outer appearance of a strap and method of use that meets the needs of those who cannot insert their middle finger through an attached strap or place their index finger inside of the conic shaped gripping aid due to hand-finger stiffness or any condition that limits hand-finger mobility.

It is also an object of the present gripping aid to create finger hand muscular memory by properly retaining appropriate digits in place.

It is a further object to provide to adults, children or any individual wishing to change a weak and embarrassing grip, a gripping aid that through use aid in the development of muscular memory while obtaining a proper tri-pod grip.

It is a further object of the writing aid to allow for better ventilation and comfort of use by cutting out the upper top part of the gripping aid in the shape of a (V). Variations to the V shape may include small cut out circles throughout the surface of the gripping shapes or lines.

It is a further object to provide a reversible writing aid that may be turned inside out to eliminate the outer appearance of an attached strap to provide comfort of use for individuals who find it difficult to grasp small objects but are able around the wider part of the gripping aid to place all appropriate fingers and thumb in a tri-pod grasp, while allowing the upper part of the inserted pencil to lie on the hand between the thumb and the index finger.

As an alternative embodiment, It is a further object to provide a solid cone-shaped gripping device with a hollow hole centered in the middle of the gripper for individuals who do not have the ability to grasp small objects and to provide weight to individuals who need help with additional weighted pencil pressure.

It is a further object to provide a gripping aid in several colors, including multi-colors.

It is a further object of the present invention to provide a gripping aid constructed of injection moldable thermoplastic or any flexible material including but not limited to cloth, vinyl, or paper. If manufactured from thermoplastic the gripping aid can be made by injection molding, extrusion or any method of manufacture known in the art. The gripping aid is preferably injection molded.

A further object is to provide a gripping aid that is sized to accommodate different sized fingers and varying sized writing implements.

A further object is to provide a gripping aid that can be used by a right-or left-handed individual and to provide indicia to help identify the placement of the upper front part of the gripper.

The present invention gripping aid may be constructed of injection moldable thermoplastic or any flexible material including but not limited to cloth, vinyl, or paper. If manufactured from thermoplastic the gripping aid can be made by injection molding, extrusion or any method of manufacture known in the art. The gripping aid is preferably injection molded.

The present gripping aid depending on materials used may be washable or designed as a one-time throw away use.

The present one piece gripping aid is sized to accommodate all sized fingers and various sized writing instruments.

As an alternative embodiment, it is a furthur object of the current gripping aid to provide a conic shaped gripping aid made as a solid cone shape with a hollow hole centrally located inside the gripping aid for the insertion of a writing implement and sized for the purpose of retaining a thin pencil or ink pen.

The thicker cone shape allows for weight in helping to provide increased pencil-pen pressure and a lower elongated stretchable lip located at the base of the gripper is designed to help to retain a writing implement.

As an alternative embodiment, the solid cone shape gripping device may be made with or without an attached strap and designed to include the grasping of spoons, forks, paintbrushes and other items that are difficult to grasp for a user with weak and limited hand-finger and thumb grips.

The aforementioned has outlined rather broadly the more pertinent and important features of the present invention in order that the detail description of the invention may be better understood and so that the present contribution to the art can be more fully appreciated.

It may be readily utilized as a basis for modifying or designing other gripping aids for writing implements and for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

Additional information of the advantages and objections of the present invention will be understood from reading the detailed description below and related references.

FIGS. 6A, 6B, and 6C illustrate a solid weighted alternative embodiment of the present invention, the present conic shaped gripper and use when turned inside out.

The same reference numerals refer to the same parts throughout the various Figures.

DETAILED DESCRIPTION OF THE INVENTION

Figure 1:
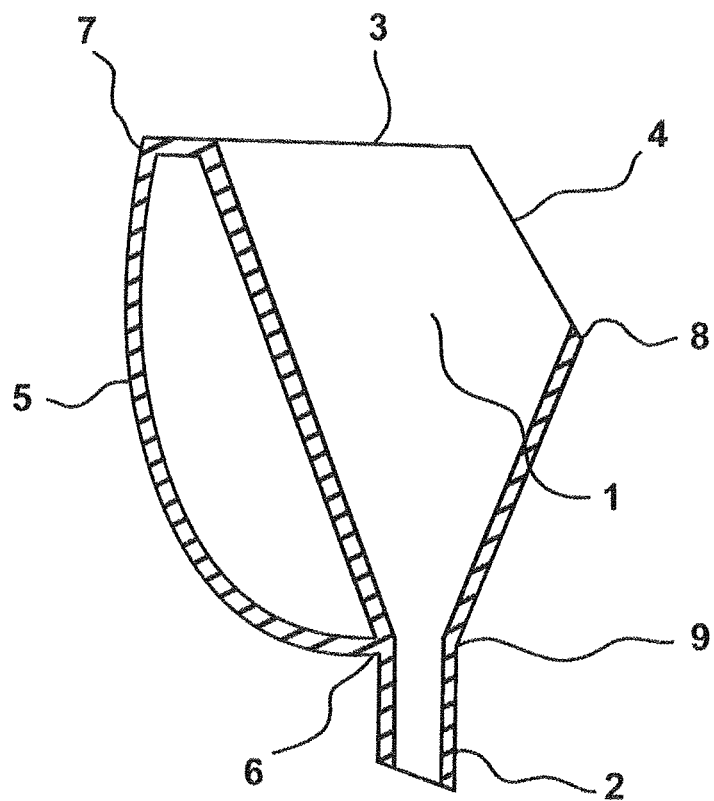
FIG. 1 illustrates a perspective view of the gripping aid of the present invention.

It was noted that many adults, especially senior citizens, arthritis sufferers, stroke victims, individuals recovering from hand surgery, children with autism or anyone with related hand-finger weakness, hand steadiness problems or hand finger stiffness, were finding it difficult to hold, apply pressure and control a writing implement. These conditions often affect an individual's fine motor skills and leave them in need of handwriting support that is not provided for by gripping aids that simply align an individual's fingers into an appropriate position.

In speaking with physical therapist, and numerous individuals at trade shows and from parents to individuals suffering from weak fine motor skills along with research on the above conditions, the present applicant saw a need to provide and improve a previous patented gripping aid.

A gripping aid that encourages increased pressure onto a writing device while providing stability to remain on top of a writing device. A gripper that would aid in proper hand finger positioning and support in retaining an index finger, a thumb or middle finger on an appropriate part of a writing implement.

Current handwriting grippers on the market do not provide for the kind of total simple and easy to use handwriting gripping devices that help to increase pressure upon a pencil, aids in staying on top of a pen or pencil, retains and supports a proper grasp, eases hand-finger unsteadiness, provides for an enlarged soft gripping surface and aids in committing to memory an improved and changed pencil grip.

As a handwriting tool to develop a tri-pod grip the gripper may be used for a short period of time to develop and commit to memory an improved pencil-pen grip and increased ability to press down and stay on top of a pencil through encouraged flexing and movement of hand finger muscles.

The gripping aid is roughly constructed in the shape of a cone with an indentation cut out of the upper part of the circular cone representing the shape of a (V or U), having a tapered central bore defined throughout. More specifically it is a truncated partial right circular cone with the truncated plane parallel with the base. Joined integrally with this frustoconical body is a pliable strap which serves to retain a middle finger in a proper writing position or a thumb to prevent a user from crossing their thumb around a pencil and touching their middle to upper index finger as a way to hold a writing implement.

The improved design entails a conic shaped barrel with an upper open end that is semi-circular at the top, and has an opening in the shape of a (V) and a lower angled elongated end for receiving a writing implement. The cut out portion on the upper part of the gripping aid serves to better direct the user as to where the second finger, which will be referred to as the index finger; thumb; or third finger, which will be referred to as the middle finger, should be placed on or inside of the conic shaped gripping aid. The cut out (V) becomes a guiding indicator of whether the attached strap below will be positioned to support and retain a middle finger or a user's thumb.

The cut out V indentation helps the user a) to identify the top of the conic gripping aid, b) indicates how the gripper should be positioned in relation to the cut out v indentation in order to retain a thumb, index finger, or middle finger, c) to indicate the location of the attached strap, and c) provides for greater ventilation.

The new gripping aid allows for multi-purpose methods to retain, support and provide increased abilities of hand-finger strength, control, and pencil pressure while writing. The present gripper also aids in retaining a proper pencil grasp and provides support for children learning to write and for adults who want to change an awkward pencil-pen grip. The gripping aid may be used as a physical therapy tool to promote hand finger movements and aids in committing to hand finger memory grips that enables improved handwriting.

Through years of observations, the current applicant and the inventor of Walden's patented device #5,662,423 discovered that many adults with hand-finger weaknesses were in need of a gripping aid that provided support, increased finger pressure, handwriting stability, and a better grip while writing. The new and improved gripping device can now be used by several individuals with different handwriting needs, and also by children and adults using the present gripping device to help improve, teach or change a handwriting grip.

The current applicant and inventor of Walden's patented gripping aid found that it was very difficult for those with hand-finger stiffness to insert a middle finger through a strap. For example, the flexibility of a user with arthritis is often limited. Placing a middle finger through a strap was seen to be uncomfortable and awkward especially for some adults. However, it was realized that some adults with weak fine motor skills without hand stiffness found the attached strap to give increased support while others found it to be difficult to use in providing the best comfortable support.

To eliminate another problem encountered in Walden's patented gripping device of not knowing where to position a user's fingers or thumb, the current gripping aid is now designed with an opening at the top of the gripper to better show directionality and placement of the index finger, middle finger and or thumb.

Removing a section in the shape of a (V) from the upper wider top part of the circular cone shape helped to solve the problems of users not knowing how to position the gripping device for use. Users found it difficult to know whether the strap should be on top facing them or on the bottom facing downward, The upper wider circular part of the cone being rounded made it difficult to see a starting and ending point.

The cut out (V) easily points out where and how a user should insert a writing implement and provides for a point of focus in helping to know where to place their index finger, middle finger and or thumb.

For example, in retaining an index finger and middle finger, the gripper is positioned with the (V) opening facing the user and the strap is located on the bottom of the gripper and is directly opposite of the v opening. When retaining a thumb in position the (V) opening is facing the user's middle finger of their dominate hand.

Cutting a portion out of the upper part of the cone in a (V) shape also solved another problem found in Walden's previous gripping device. Users felt enclosed and discomfort from heat after a period of use. The (V) shaped opening allows for better ventilation and provides for a not so enclosed feeling, while still giving the kind of support needed to develop better pencil or pen pressure, grip and control, all aiding in improving penmanship skills and legible handwriting.

While there is now an opening in the upper part of the cone shape, it continues to be just as effective in helping children and adults to improve handwriting control, legibility, and adequate pencil/pen pressure.

The cone shaped barrel aids in positioning and retaining an index finger on top of a pen/pencil and provides for the user to be able to increase the pressure applied on a writing implement. It was discovered that the cone shaped barrel provides for a spring-like interaction as follows:

When a user presses down on a writing implement and comes in contact with the lower to middle half of the inside wall of the cone shaped gripping aid, it provides a form of physical therapy to help strengthen the movement of the index finger by providing a form of exercise by aiding the movement of the lower part of the index finger and knuckle joint. This controlled movement helps to develop increased muscle strength which aids in the development of better support and control of movement.

The gripping aid has an attached outer strap coupled to the upper and lower end of the conic shaped barrel to support and retain a user's middle finger or thumb. A new discovery was made and problem solved by using the outer attached strap for two different purposes. The first being to use the strap to place a middle finger through it to help retain a proper pencil/pen grip and now to aid in preventing an improper grasp involving placement of a thumb.

By positioning the strap on the right or left side of a user's thumb, a user's thumb can now be supported, guided and retained to prevent the thumb from crossing over to touch the index finger while grasping a writing implement. The crossing over of a thumb in grasping a pencil does not give the user the best support and control in using a writing instrument.

The present inventor of Walden's patented gripping aid also found that it was very difficult for those with hand-finger stiffness to insert a middle finger through a strap. For example, the flexibility of a user with arthritis is often limited. Placing a middle finger through a strap was seen to be by some with stiff hand-finger mobility uncomfortable and awkward and especially for an adult with limited hand finger mobility.

However, it was realized that some adults with weak fine motor skills without hand stiffness found the strap to give increased support while others found it to be difficult to use in providing the best comfortable support.

The body of the gripping aid is made of a flexible material and is reversible, meaning that it can be turned inside out. Turning the gripping aid inside out reverses the location of the attached outer strap positioned beneath the cone shaped sleeve, to be located inside of the cone.

When the gripping aid is turned inside out it eliminates the presence of an outer strap and is more helpful to individuals who have difficulty in placing their middle finger through a strap due to limited hand-finger mobility but may be able to insert their index finger inside of the cone and on top of the pencil to aid in giving pencil/pen pressure and grasp support.

Also a new embodiment that is not reversible and entails a solid version of the present gripping aid's shape that allows for the insertion of only a writing implement may be designed and implemented for use with individuals that find it difficult to grasp objects and have limited hand finger strength in holding small objects or have conditions hand finger stiffnesss and limited fine motor movement. User with limited hand-finger mobility will be able to grasp and hold a writing implement by positioning the fingers and thumb in a tri-pod grasp around the entire body of the conic shaped barrel gripping aid.

The shape of the more solid gripping device has an ascending shape that goes from wide to narrow to accommodate a wider grasp and placement of fingers and hand. The soft texture of the gripping aid provides relief for users that experience finger pain and calluses from grasping a writing implement for long periods of time.

The current gripping aid also has a changed lower elongated and angled open end for better retaining a writing implement.

The device according to the present invention will now be discussed in greater detail by reference to the drawings.

FIG. 1 illustrates a perspective view of the gripping aid comprising a conic shaped tapered sleeve member 1 having a first open elongated angled end 2 and a second open end 3 with a centered open V shape indentation to assist with direction of use and ventilation 4. Coupled between the first end 2 and the second end 3 of the gripping aid is a strap 5, having a first end 6 and a second end 7 dimensioned to retain a finger or thumb within.

Figure 2:
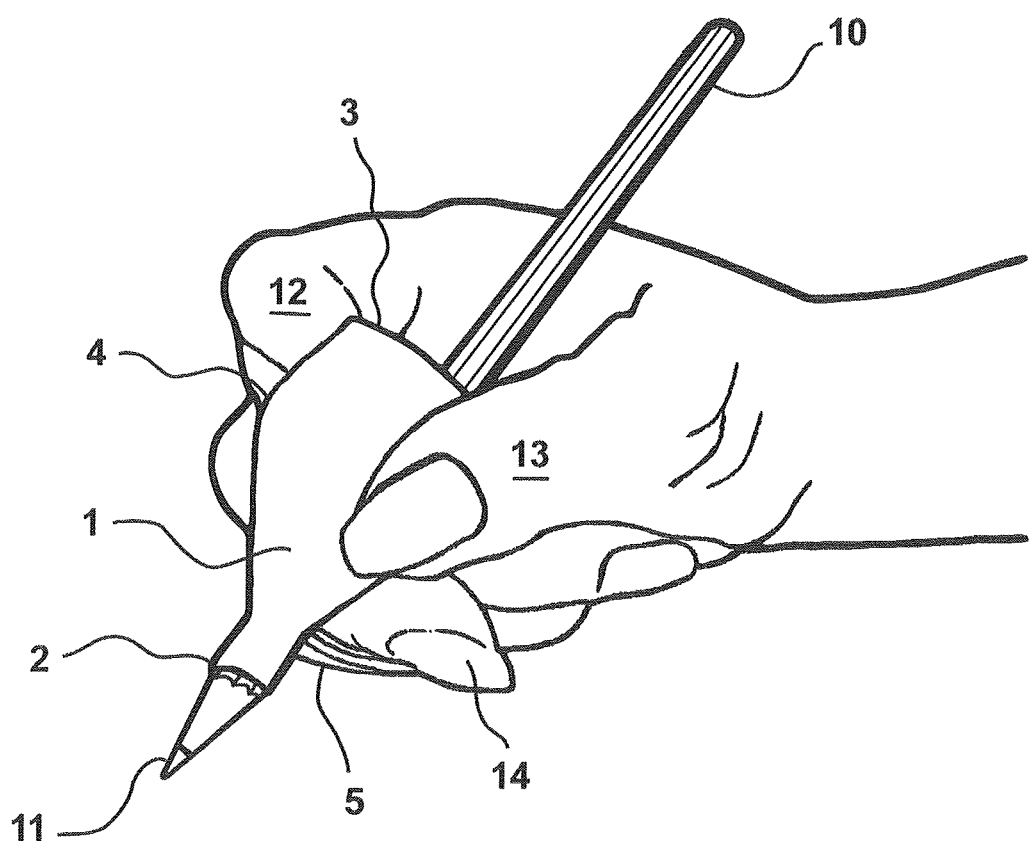
FIG. 2 illustrates the gripping aid of the present invention and writing implement with a user's hand supporting an index finger, middle finger and thumb placement positioned upon a writing implement.

FIG. 2 illustrates the gripping aid properly positioned upon a writing implement 10. Specifically, the narrow first open end 2 is closer to the writing tip 11 of the writing implement. The diameter of the writing implement should be slightly larger than the diameter of the first open end. The axial length of the conic member is preferably 1 to 2 inches, but should preferably always sufficiently cover the first bend in the finger 12 of the user when in use.

The width of the first and second ends of the gripping aid cannot be standardized because the width of the writing aid or utensil or object will vary greatly. Preferably the width of the second end of the gripping aid is 1 inch to 2½ inches and sufficient to cover the first bend of the user's index finger.

Figure 3A:
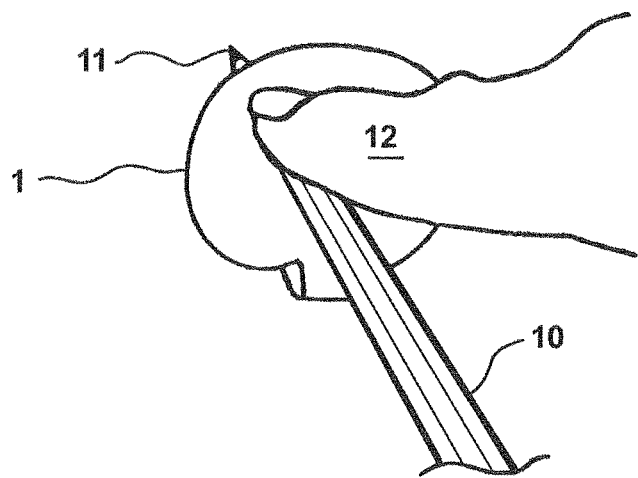
FIG. 3A illustrates a view of the inside of the gripping aid, showing the distance between the placement of the index finger on a writing implement to the inside of the lower half of the inner wall of the conic shape gripper.
Figure 3B:
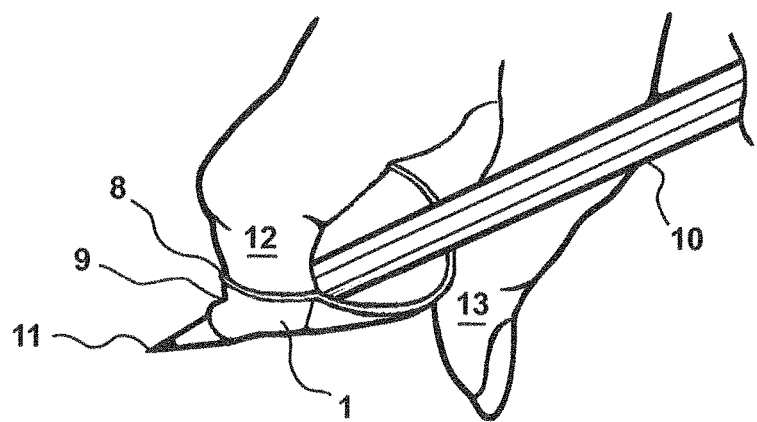
FIG. 3B illustrates a view of the inside contact of the index finger against the lower inside of the conic shaped gripper during use while pressing down on a writing implement.

FIGS. 3A and 3B illustrate a view of the inside of the present gripping aid 1. The v indentation 4 faces the user with pencil inserted 10 and index finger 12 flatly lying on top of a writing implement 10 to indicate the space between the inner wall of the conic gripper 1 and index finger 12.

The inner space between the index finger and inner lower wall should be between ⅜ and 1 inch to allow ample space movement of the index finger to the inner wall. The shape of the conic barrel may vary as long as the contact and dimensions allow for movement of the index finger in contact with the inner wall of the gripping aid.

Figure 4A:
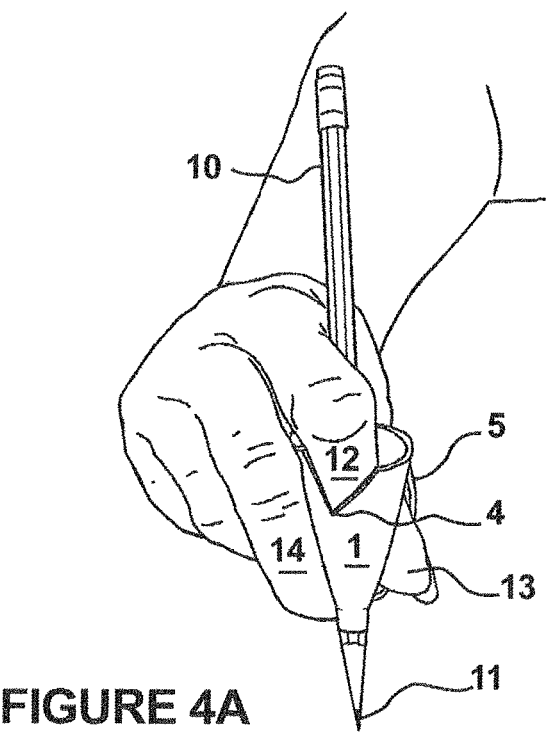
FIGS. 4A and 4B illustrate the present gripping aid and a user's placement of thumb, index finger and middle finger for a right or left handed individual with the indented v shape positioned to face a user during use.
Figure 4B:
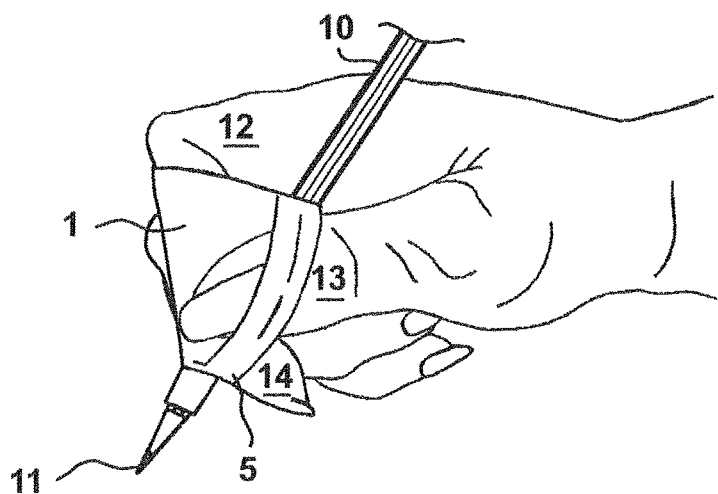

FIGS. 4A and 4B illustrate the gripping aid of the present invention in use. The upper v indentation 4 for a right or left handed individual is positioned to face the user's dominate middle finger 14. Inserted within the conic shaped gripper is an index finger 12 positioned on top of a writing implement 10. The user's thumb 13 is placed throughout the attached strap 5 and positioned to touch the lower outer cone shape 1 of the gripping device while the thumb 13 is retained in the strap.

Figures 5, 5A:
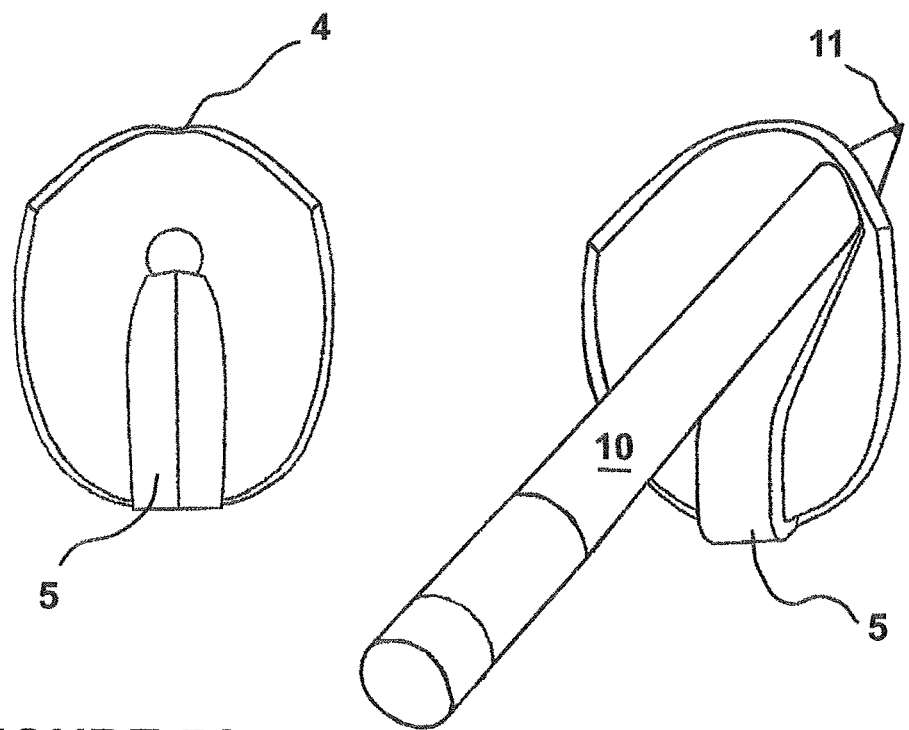
FIG. 5 is a perspective view of the gripping aid of the present invention illustrating the gripping aid in an alternative body turned inside out.
FIG. 5A is a top view of the gripping aid shown in FIG. 5 illustrating the gripping aid in an alternative body turned inside out.

FIG. 5 illustrates the present conic shaped gripper 1 turned inside out. The strap 5 is located within the cone shaped gripping aid and is positioned beneath an inserted writing implement. The v indentation 4 faces the user.

The inner space between an index finger on top of a pencil and the inner space to the lower shaped conic wall should be between ⅜ and 1 inch to allow for finger movement. The gripping aid may lie within the crest of the hand between the index finger and thumb with all digits, thumb, index finger and middle finger positioned outside of the conic gripping aid in a tri-pod grasp or the user may insert only an index finger within the inside of the conic gripper.

Figure 6A:
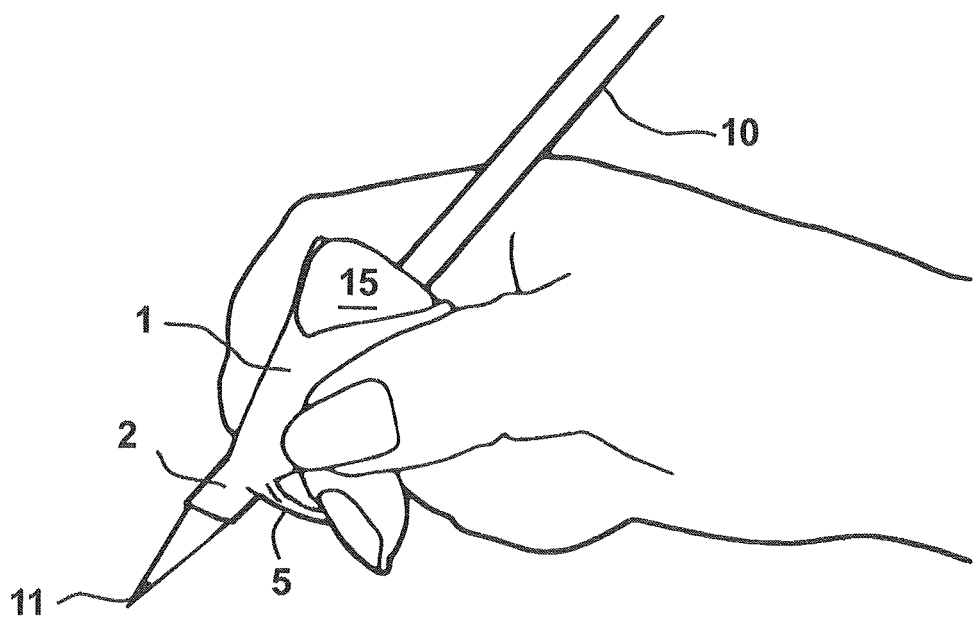
Figure 6A:
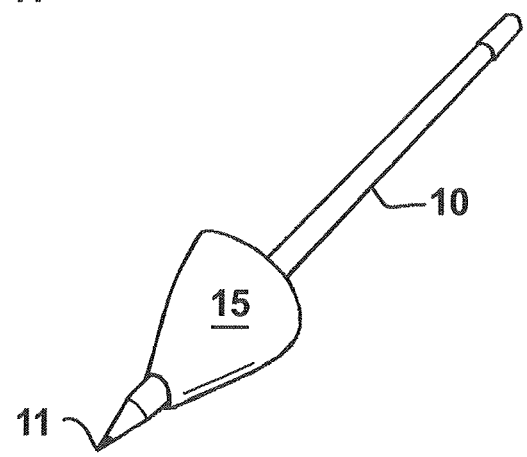
Figure 6A:
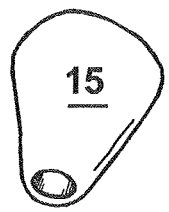

FIG. 6 illustrates an alternative embodiment of the conic shaped gripper 1, with or without attached strap 5. The inside of the gripper is filled in 15 to only allow the insertion of a pencil or thin ink pen to remain stationary during use. The writing implement is secured by the lower elongated angled lip. Preferably the inside filling within the conic gripper should be made of a firm but flexible rubber as in the outside of the gripping aid or some other material to give weight and firmness, i.e. clay or some other material know in the art when grasping a writing implement.

The filling 15 may also be shaped to receive a writing implement and be detachable and inserted into the conic shaped gripper 1. The conic shape filling with a descending width allows a user different grasping positions. The writing implement is slideable throughout the inner hole positioned to receive a writing implement.

Figure 7:
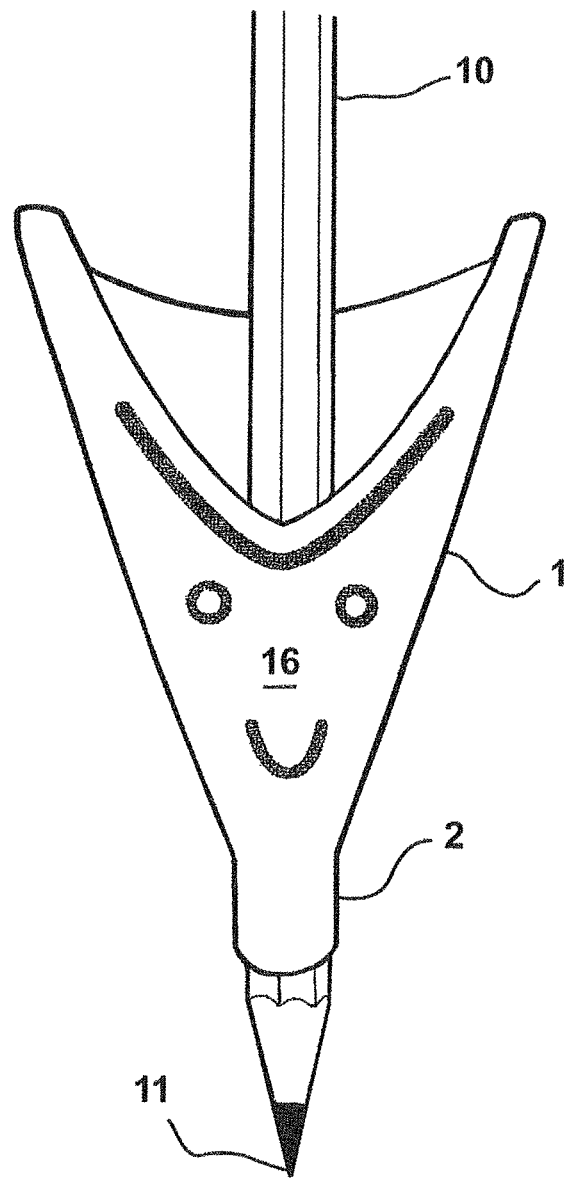
FIG. 7 illustrates a solid alternative embodiment of the present invention illustrating surface indicia.

FIG. 7 is an illustration of a smiley face indicia 16 which may be imprinted onto the front of the conic shape gripper Instructions and methods of use of the present gripping aid will now be explained.

1. Gripping aid instructions to aid individuals in learning a proper penmanship grip, to correct an improper grip, improve pencil pressure or gain better handwriting control are explained below.

A writing implement is inserted into and through the central bore of the gripping aid. The user should hold the tip of the inserted pen or pencil of the conic gripping aid in the user's non-dominate hand. Position the upper open upper part of the conic barrel which is cut out in the shape of a V or U, to face the user along with the inserted writing implement.

Firmly insert the index finger inside the conic barrel onto the top of the writing implement (entering on the right or left side of the pencil depending on the users dominate hand) so that the upper part of the pencil or pen lie in the crest of the hand between the thumb and index finger.

A middle finger is then passed through an attached strap located beneath the conic barrel, and the thumb is placed to the user's right side or left on the outside of the gripper aid, depending on hand dominance, in a pressing motion to give support to the enclosed pencil.

When the gripping aid is properly oriented on a writing implement, the smaller first end of the cone shaped portion is nearer to the writing tip of the writing implement. Remember, that the cut out portion of the upper gripper end and smiley face indicia 16 or lines should face away from the user.

Often improper gripping positions become an instilled habit and in order to change to a more effective handwriting grip and legible printing a gripping aid that prevents an improper grip is needed to establish new grasping habits.

The current gripper aids in establishing a tripod grip and actually prevents during use the continuation of improperly grasping a writing implement. It is also designed to help increase pencil pen pressure when pressing down on a writing implement during the process of writing. Insertion of fingers or a thumb through an attached strap on the gripping aid helps to retain a pencil-pen grip that better supports legible handwriting skills.

Some grips are very embarrassing especially for teens and adults and do not provide the best grip for controlling a writing implement. Often these improper grips slows the speed in which users' write and later in life become very uncomfortable in that it impedes the ability to form letters and circles with the hands being able to move in a 360 degree motion. A few improper kinds of pencil-pen grips are described below:

Thumb, index finger and middle finger encases the side of a writing implement. Thumb, index, middle and 4th finger encase the top and sides of the writing implement. All fingers and hand encase the writing implement. The thumb, index finger and middle finger encase the side of a writing implement with the 4th finger beneath a writing implement.

Crossing the thumb over to the upper part of the index finger in a squeeze like position to hold a writing implement.

The present gripping device helps to eliminate the above grips which do not give users the best support and control in using a handwriting device.

2. The importance of the cut out area located in the upper portion of the conic shape gripping aid and methods of use is explained below.

The cut out opening at the top of the gripping aid in the shape of a V or horseshoe serves the purpose of visually assisting a user in knowing how to place a thumb, index finger or middle finger to help support and retain different handwriting concerns. It also serves to provide proper ventilation and makes using the gripper easier.

The cut out (V) easily points out where and how a user should insert a writing implement and provides for a point of focus in helping to know where to place their index finger, middle finger and or thumb.

For example, in retaining an index finger and middle finger, the gripper is positioned with the open (V) shape facing the user and the strap is located on the bottom of the gripper directly opposite of the v opening.

When retaining a thumb in position the (V) opening is positioned to face the user's middle finger of their dominate hand.

The (V) shaped opening allows for better ventilation and provides for a not so enclosed feeling, while still giving the kind of support needed to develop better pencil or pen pressure, a steady grip and control, which aids in improving penmanship skills and legible handwriting.

3. For the purpose of preventing an improper thumb grasp from touching and engaging the upper part of the index finger in an effort to embrace and hold a pen or pencil, the present gripping aid methods are described and used in the following way.

Children and Adults often grip a writing device by supporting a pencil or pen by squeezing the writing implement between their upper thumb and upper index finger. This grasp does not give the best grip in controlling a writing implement. To prevent and correct this improper thumb grasp the 1 piece multi-purpose gripper is used in the following way.

To help give proper thumb support while using a pen or pencil, hold the gripping device with the non dominate hand, insert a writing implement through the conic gripping aid. For right or left handed users, place the conic gripper so that the opening cut out v shape faces a middle finger of a user's dominate hand. With the cut out v shape facing the middle finger of a user's dominate hand insert the thumb through the strap located on the side of gripper then insert and place the index finger onto the writing implement.

The middle finger is now placed beneath the conic gripping aid. Adjust the thumb and index finger so as to allow these digits to squeeze the inserted pencil to give better support in holding a writing implement. The strap aids in allowing the lower end tip of the thumb to have a proper contact on the writing implement and prevents the user's thumb from touching the user's mid to upper index finger in holding the writing implement. The upper part of the pencil or pen now lie in the crest of the hand between the thumb and index finger.

The strap prevents a user's improper grasp of retaining a writing implement that rest in the crest of the hand and is supported by squeezing the upper parts of the thumb and index finger.

4. For the purpose of increasing hand finger pressure upon a writing implement and to help a user's fingers to stay ontop of a pen or pencil, the current gripping aid methods of use is described in the following way.

The current gripping aid helps to provide individuals who have difficulty in producing a darker print due to a lack of pressure upon a pen or pencil. The current gripping aid improves the application of a user's pressure onto a writing implement. As a user inserts their index finger inside of the cone shaped gripping aid and onto the top of a pen or pencil, with middle finger and thumb properly placed, the unique and unobvious inner construction of the hollow cone shaped gripping aid provides for a spring-like interaction between the inner wall of the gripper and the lower index finger.

The movement of the index finger while pressing down on a writing implement forces the index finger to come into contact with the inner wall of the cone shaped upper component. This interaction creates a bounce back effect that produces the index finger to push back onto the writing implement that produces an increase in pressure applied to the writing implement.

5. For the purpose of providing hand-finger steadiness for individuals without the abiity to grasp smaller or thinner objects, the current gripping aid has a flexibility factor and reversible component and method of use that is described in the following way.

For the purpose of providing hand finger steadiness upon a writing implement to individuals without the ability of the hand and fingers to grasp smaller items and are unable to insert their middle finger, thumb or index finger through a strap, the flexible material that forms the conic shaped gripper in its preferred embodiment is soft and flexible and allows for the gripper to be turned inside out to provide a user a wider grasp by positioning digits around and below the outer side of the conic shaped gripping aid. Providing such a grip to individuals who experience inabilities to grasp smaller items improves hand steadiness and provides for the user a more comfortable and efficient grasp.

For individuals with an inability to grasp smaller and thinner objects, the conic shaped writing aid is first turned inside out so that the strap appears inside of the gripper and the cut out (V) portion of the gripper faces the user. Next, a writing implement is passed through the conic barrel. The thumb, index finger and the middle finger of the user's dominate hand are positioned to grasp the outer sides of the conic shaped barrel gripper.

All 3 digits are positioned to form a tri-pod grasp around the cone, allowing for a wider grasp for those who find it difficult to embrace a thinner writing implement. The gripper also offers comfort of use for those who experience calluses and pain during prolonged writing.

The turned inside-out gripper may also be used by inserting only the index finger inside the conic barrel to give added pencil-pen pressure support while still placing the middle finger and thumb around the outer and under surface of the gripping aid to form a tri-pod grip.

For the above hand-finger grip, the user positions the cut out (V) opening on the gripper to face the user, then inserts a writing implement through the inside of the barrel. The index finger is now placed inside of the cone and onto a writing implement. The thumb, and the middle finger of the user's dominate hand are positioned to grasp the outer and below sides of the conic shaped barrel gripper.

Although the gripper is explained in its preferred form, in an alternative embodiment, the gripper may later be manufactured without the presence of an outer strap.

6. As an alternative embodiment, the conic shaped gripping aid may be made as a solid conic shape with a hollow hole centrally located inside and throughout the gripping aid and said hole may be sized for the purpose of snugly retaining a writing implement or other small items that may be difficult to grasp.

The inner added thickness inside of the conic shaped barrel allows for added weight in helping to provide increased pencil-pen pressure without inserting an index finger inside of the gripper and onto a writing implement. A lower elongated stretchable lip located at the base of the gripper helps to retain a writing implement.

To position for use for individuals with an inability to grasp small or thin objects, or finds holding a writing implement uncomfortable and are in need of a more solid and wider grip, the shape of the conic funnel shaped gripper provides for degrees of wideness in which the upper part of the gripping aid is circular, larger and descends going downward from wide to narrow.

To use, the user inserts a writing implement through the central bore of the trundicated gripper without leaving space for the insertion of an index finger. The user then positions fingers and thumb in a tri-pod grasp touching the outer shape of the gripper. The gripper may be made with or without an attached strap. The gripper also offers comfort of use for those who experience calluses and pain during prolonged writing. Other items may be attached within and at the base of the alternative embodiment to retain by example but not limited to eating utensils, paint brushes, tooth brushes and other small hand held items.

7. Additional information in better describing the use and methods of the present inventions are as follows.

The current gripping aid lip has a long elongated and angled open end for receiving and retaining a writing implement and for better supporting the downward index finger pressure onto a writing implement.

The gripping aid may be neutral, transparent or manufactured in bright colors. In its preferred embodiment the extended tip of the lower end of the gripping aid may vary in length and is made such that it accommodates various sized writing implements such as pens, pencils, thin crayons and thin markers or other small hand held objects and may be manufactured in different sizes to accommodate different sized writing implements.

Ideally, the present invention should be sized such that the writing implement inserted there through, i.e. a crayon, pen, or pencil, stays stationary when the gripping aid is in use, but has enough leeway to slide the writing implement through the conic barrel. Specifically, the gripping aid allows a writing implement to slip through the conic barrel but does not permanently attach to the barrel. It is held in place by the thumb, index finger and middle finger during use.

Although this invention has been described in its preferred form with a certain degree of particularity with respect to a gripping aid for a writing implement, it is understood that the present disclosures of the preferred form have been made only by way of example and that numerous changes in the details of structures and the composition of the system may be resorted to without departing from the spirit and scope of the invention.

From a broad viewpoint, the present invention is a gripping aid and system for a writing implement. An upper component has a generally cone shaped configuration with an upper end and a lower end. A lower component has a generally cylindrical shaped configuration with an upper end and a lower end. The lower end of the upper component and the upper end of the lower component are integrally fabricated to form a lower point and a high point. A V-shaped cut out is formed in the upper end of the upper component above the lower point. A strap has an arcuate configuration with a top and a bottom. The top is integrally fabricated with the upper end of the upper component. The bottom is integrally fabricated with the intersection.

In addition, the upper component and the lower component both have an interior surface and an exterior surface. The system has a primary mode of operation with the exterior surface exposed and with the strap exposed and on the exterior surface. The system has a secondary mode of operation with the interior surface exposed and with the strap hidden within the upper component.

Optional features include an insert 17. The insert is frusto-conical in shape with a cylindrical passageway there through. The insert is removably received in the upper component. The cylindrical passageway is for removably receipt of a writing implement. The insert is fabricated for a rigid clay material. Note FIGS. 6A, 6B, and 6C.

The optional features include indicia on the exterior surface of the upper component. Note FIG. 7.

Another optional feature included is a pencil 10 with a major section above and a point 11 below. Note FIG. 2.

From a specific viewpoint, the gripping aid system is for a writing implement 10. First provided is an upper component 1 having a generally cone shaped configuration. The upper component has an upper end 3 with a diameter of 1.50 inches plus or minus 10 percent. The upper component has a lower end with a diameter of 0.25 inches plus or minus 10 percent. The upper component has an upper axis with a length of 2.0 inches plus ro minus 10 percent.

A lower component 2 has a generally cylindrical shaped configuration. The lower component has an upper end and a lower end. The lower component has a lower axis coextensive with the upper axis. The lower end of the upper component and the upper end of the lower component are integrally fabricated to form an intersection 9. The lower end of the lower component is cut at an angle to form a low point and a high point. The low point is 0.375 inches beneath the intersection. The high point is 0.125 inches beneath the intersection.

A V-shaped cut out 4 is formed in the upper end of the upper component above the low point 8. The V-shaped cut out extends downwardly arcuately for between 90 degrees and 180 degrees. The V-shaped cut out has a height of 0.75 inches plus or minus 20 percent.

A strap 5 has an arcuate configuration with a top 7 and a bottom 6. The top is integrally fabricated with the upper end of the upper component diametrically opposed with respect to the V-shaped cut out. A ledge is horizontally disposed between the strap and the upper end of the upper component. The bottom of the strap is integrally fabricated with the intersection. The strap is diametrically opposed with respect to the V-shaped cut out. The system is fabricated of flexible polymer chosen from the class consisting of polypropylene, polyethylene, ply butylene and polyvinyl chloride.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A gripping aid and system for a writing implement comprising:
    an upper component having a generally cone shaped configuration with an upper end and a lower end;
    a lower component having a generally cylindrical shaped configuration with an upper end and a lower end, the lower end of the upper component and the upper end of the lower component being integrally fabricated to form an intersection, the lower end of the lower component being cut at an angle to form a low point and a high point;
    a V-shaped cut out formed in the upper end of the upper component above the low point; and
    a strap having an arcuate configuration with a top and a bottom, the top being integrally fabricated with the upper end of the upper component, the bottom being integrally fabricated with the intersection.

2. The gripping aid and system as set forth in claim 1 wherein the upper component and the lower component both have an interior surface and an exterior surface, the system having a primary mode of operation with the exterior surface exposed and with the strap being exposed and on the exterior surface, the system having a secondary mode of operation with the interior surface exposed and with the strap being hidden within the upper component.

3. The gripping aid and system as set forth in claim 2 and further including an insert (15), the insert being frusto-conical in shape with a cylindrical passageway there through, the insert being removably received in the upper component, the cylindrical passageway for removable receipt of a writing implement, the insert being fabricated of a rigid clay material.

4. The gripping aid and system as set forth in claim 2 and further including indicia on the exterior surface of the upper component.

5. The gripping aid and system as set forth in claim 1 wherein the writing implement is a pencil (10) with a major section above and a point (11) below.

6. The system as set forth in claim 5 wherein, the movement of an index finger while pressing down on a writing implement forces the index finger to come into contact with an inner wall of the upper component whereby an interaction creates a bounce back effect that produces the index finger to push back onto the writing implement that produces an increase in pressure applied to the writing implement.

7. A gripping aid system for a writing implement (10) consisting of:
    an upper component (1) having a generally cone shaped configuration, the upper component having an upper end (3) with a diameter of 1.50 inches plus or minus 10 percent, the upper component having a lower end with a diameter of 0.25 inches plus or minus 10 percent, the upper component having an upper axis with a length of 2.0 inches plus or minus 10 percent;
    a lower component (2) having a generally cylindrical shaped configuration, the lower component having an upper end and a lower end, the lower component having a lower axis coextensive with the upper axis, the lower end of the upper component and the upper end of the lower component being integrally fabricated to form an intersection (9), the lower end of the lower component being cut at an angle to form a low point and a high point, the low point being 0.375 inches beneath the intersection, the high point being 0.125 inches beneath the intersection;
    a V-shaped cut out (4) formed in the upper end of the upper component above the low point (8), the V-shaped cut out extending arcuately for between 90 degrees and 180 degrees, the V-shaped cut out having a height of 0.75 inches plus or minus 20 percent; and
    a strap (5) having an arcuate configuration with a top (7) and a bottom (6), the top being integrally fabricated with the upper end of the upper component diametrically opposed with respect to the V-shaped cut out, a ledge horizontally disposed between the strap and the upper end of the upper component, the bottom of the strap being integrally fabricated with the intersection, the strap being diametrically opposed with respect to the V-shaped cut out, the system being fabricated of flexible polymer chosen from the class consisting of polypropylene, polyethylene, polybutylene and polyvinyl chloride.

* * * * *